United States Patent
Ramirez et al.

(10) Patent No.: US 6,603,574 B1
(45) Date of Patent: Aug. 5, 2003

(54) IMAGE COLOR REGISTRATION SENSOR CALIBRATION

(75) Inventors: Olga Y. Ramirez, Rochester, NY (US); Mark A. Omelchenko, Lexington, KY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/447,231

(22) Filed: Nov. 23, 1999

(51) Int. Cl.⁷ .................. B41B 00/00; H04N 1/00; G03G 15/01; G01N 21/55; B41J 2/385
(52) U.S. Cl. .................. 358/1.9; 358/1.2; 358/1.5; 358/400; 399/41; 356/445; 347/118
(58) Field of Search .................. 399/41; 347/118; 358/462, 464, 504, 406, 400, 1.9, 1.2, 1.5; 356/388, 394, 396, 445, 71

(56) References Cited

U.S. PATENT DOCUMENTS

| | | | | |
|---|---|---|---|---|
| 4,965,597 A | * | 10/1990 | Ohigashi et al. | 347/118 |
| 5,537,190 A | * | 7/1996 | Folkins et al. | 399/41 |
| 6,034,788 A | * | 3/2000 | Sasanuma et al. | 358/400 |
| 6,122,075 A | * | 9/2000 | Yamada et al. | 358/406 |
| 6,271,934 B1 | * | 8/2001 | Hayashi | 358/1.9 |

\* cited by examiner

*Primary Examiner*—Edward Coles
*Assistant Examiner*—Jason Sherrill
(74) *Attorney, Agent, or Firm*—Oliff & Berridge, PLC (57) ABSTRACT

Color imaging methods and systems are provided where each color separation image is to be registered in a composite manner under a variety of machine conditions. Registration sensors are provided to register the color separations under a variety of machine conditions while accounting for the different types of registration sensors used. A controller calibrates the registration sensors automatically based on set-up data and, using the calibrated sensors, controls the output of the image data for one or more of the color separation images to reduce or eliminate image registration offsets. The registration sensors are calibrated by directly measuring set-up marks during set-up. Each registration sensor outputs a feedback to the controller during set-up to account for phenomenon caused by variation in toner concentration or sensor susceptibility. The registration sensors provide a plurality of set-up sensor feedback values, one for each of at least four colors and one for a bare photoreceptor belt. The controller determines the differences between the set-up sensor feedback value for each of the four colors and the set-up feedback value for the bare photoreceptor belt and uses the determined differences to adjust the operating conditions for each sensor, including the amount of driving current applied to the sensor.

22 Claims, 7 Drawing Sheets

IMAGE COLOR REGISTRATION SENSOR CALIBRATION

BACKGROUND OF THE INVENTION

1. Field of Invention

This invention generally relates to detecting and maintaining good image registration in color image processing.

2. Description of Related Art

Electrophotography, a method of copying or printing documents, is performed by exposing an image representation of a desired original image onto a substantially uniformly charged photoreceptor, such as a belt. In response to that image representation, the photoreceptor discharges to create a latent image of the desired original image on the photoreceptor's surface. Developing material, or toner, is then deposited onto the latent image to form a developed image. The developed image is then transferred to a final substrate, such as paper. The surface of the photoreceptor is then cleaned of residual developing material and recharged in preparation for the production of another image.

Color images may be produced by repeating the above process once for each differently colored toner that is used to make a composite color image. For example, in one color imaging process, referred to herein as the Recharge, Expose and Develop, Image On Image (REaD IOI) process, a charged photoreceptor surface is exposed to an image which represents a first color. The resulting electrostatic latent image is then developed with a first colored toner to form a first color separation image. The charge, expose and develop process is repeated, for example, for a second colored toner, then for a third colored toner, and finally for a fourth colored toner to form second, third and fourth color separation images. The various differently-colored color separation images are placed in superimposed registration with the first developed color separation image so that a desired composite color image results. The composite color image is then transferred and fused onto an image recording substrate or medium.

SUMMARY OF THE INVENTION

Registration offsets in a developed image are undesirable because, if the developed image is transferred to a final substrate without adjusting for the registration offsets, the final transferred image will include the registration offsets. That is, each different color separation image will be slightly misregistered, or offset, relative to the other color separation images and/or the receiving substrate. By using registration sensors to register the color separation under a variety of machine conditions without accounting for differences between sensor types, an incorrect number of signals may be detected which may not correctly adjust for the misregistration or offset.

This invention provides color imaging methods and systems where each color separation image is to be registered in a composite manner under a variety of machine conditions.

This invention separately provides systems that calibrate the registration sensors automatically based on set-up data and, using the calibrated sensors, controls the output of the image data for one or more of the color separation images to reduce or eliminate image registration offsets.

This invention further provides methods for calibrating registration sensors by directly measuring set-up marks during a set-up procedure to account for phenomenon caused by variation in machine conditions, such as toner concentration, sensor susceptibility, and toner contamination on the sensor.

The systems and methods of this invention separately provide registration sensors which provide feedback signals for each of at least four colors and for a bare photoreceptor belt, where each registration sensor outputs the feedback signals to a controller during a set-up procedure.

The systems and methods of this invention separately provide a controller that determines the differences between the set-up sensor feedback value for each sensor for each of the four colors and the set-up feedback value for each sensor for the bare photoreceptor belt. The systems and methods of this invention use the determined differences to determine desired operating conditions for each sensor, including an amount of driving current to be applied to the sensor.

In accordance with the systems and methods of this invention, problems in registration, such as misalignment, are reduced or eliminated without being influenced by variations in machine conditions.

In another aspect of the systems and methods of the invention, image data is adjusted based on determined image registration offsets irrespective of variation in machine conditions. In yet another aspect of the systems and methods of this invention, the image processing device outputs an image based on image control data adjusted based on determined image registration offsets.

These and other features and advantages of the systems and methods of this invention are described in or are apparent from the following detailed description of the preferred embodiments.

BRIEF DESCRIPTION OF THE DRAWINGS

The invention will be described in relation to the following drawings, in which reference numerals refer to like elements, and wherein.

DETAILED DESCRIPTION OF PREFERRED EMBODIMENTS

Figure 1:
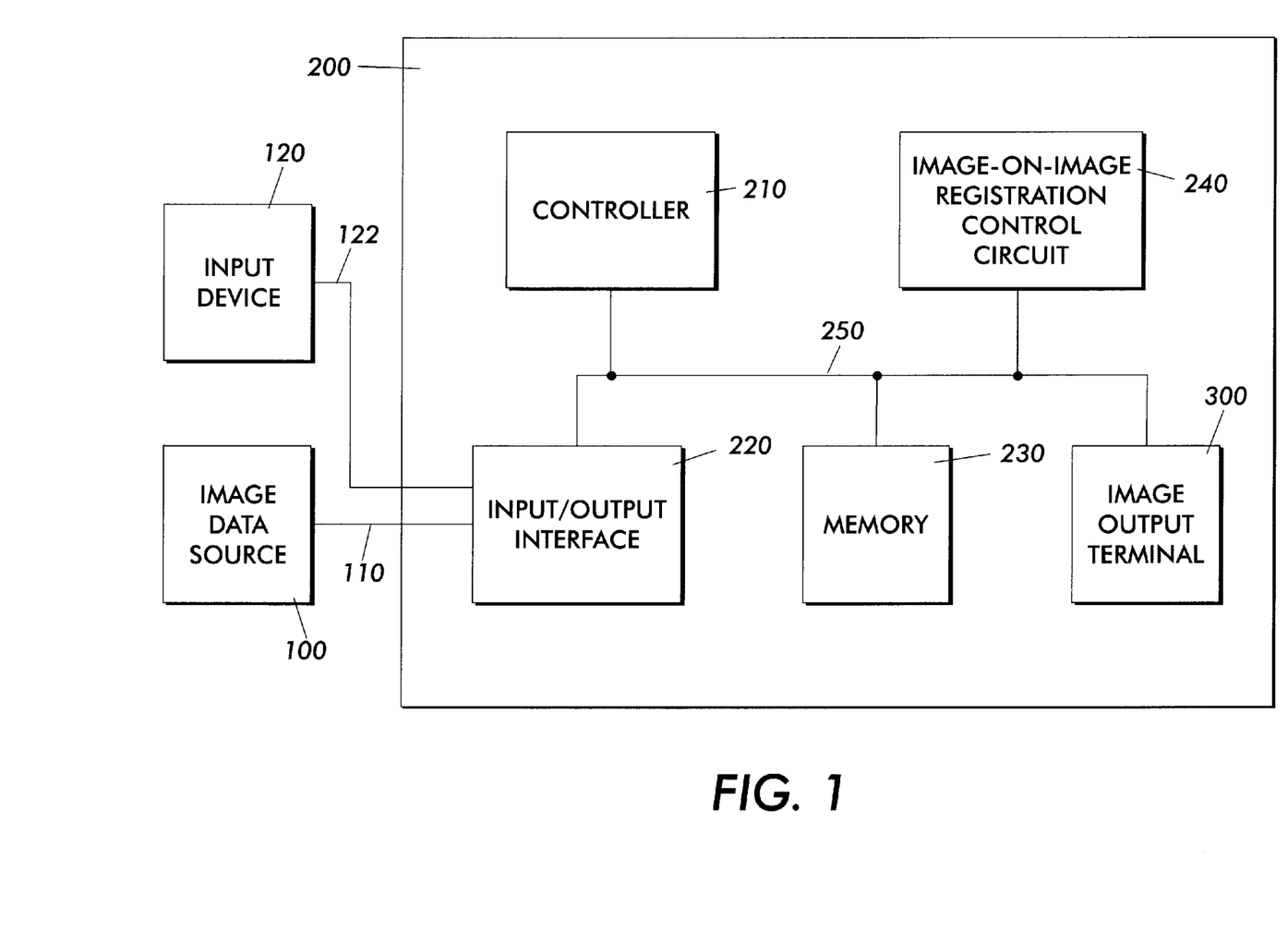
FIG. 1 shows a block diagram of one exemplary embodiment of an image processing apparatus that incorporates the image registration control systems and methods in accordance with this invention.

FIG. 1 is a block diagram of one exemplary embodiment of an image processing apparatus 200 incorporating the image registration control systems and methods in accordance with this invention. As shown in FIG. 1, an image data source 100 and an input device 120 are connected to the image processing apparatus 200 over links 110 and 122, respectively. The image data source 100 can be a digital camera, a scanner, or a locally or remotely located computer, or any other known or later developed device that is capable of generating electronic image data. Similarly, the image data source 100 can be any suitable device that stores and/or transmits electronic image data, such as a client or a server of a network. The image data source 100 can be integrated with the image processing apparatus 200, as in a digital copier having an integrated scanner. Alternatively, the image data source 100 can be connected to the image processing apparatus 200 over a connection device, such as a modem, a local area network, a wide area network, an intranet, the Internet, any other distributed processing network, or any other known or later developed connection device.

It should also be appreciated that, while the electronic image data can be generated at the time of printing an image from an original physical document, the electronic image data could have been generated at any time in the past. Moreover, the electronic image data need not have been generated from the original physical document, but could have been created from scratch electronically. The image data source 100 is thus any known or later developed device which is capable of supplying electronic image data over the link 110 to the image processing apparatus 200. The link 110 can thus be any known or later developed system or device for transmitting the electronic image data from the image data source 100 to the image processing apparatus 200.

The input device 120 can be any known or later developed device for providing control information from a user to the image processing apparatus 200. Thus, the input device 120 can be a control panel of the image processing apparatus 200, or could be a control program executing on a locally or remotely located general purpose computer, or the like. As with the link 110 described above, the link 122 can be any known or later developed device for transmitting control signals and data input using the input device 120 from the input device 120 to the image processing apparatus 200.

As shown in FIG. 1, the image processing apparatus 200 includes a controller 210, an input/output interface 220, a memory 230, an image registration control system 240 and an image output terminal 300, each of which is interconnected by a control and/or data bus 250. The links 110 and 122 from the image data source 100 and the input device 120, respectively, are connected to the input/output interface 220. The electronic image data from the image data source 100, and any control and/or data signals from the input device 120, are input through the input interface 220, and, under control of the controller 210, are stored in the memory 230 and/or provided to the controller 210.

The memory 230 preferably has at least an alterable portion and may include a fixed portion. The alterable portion of the memory 230 can be implemented using static or dynamic RAM, a floppy disk and disk drive, a hard disk and disk drive, flash memory, or any other known or later developed alterable volatile or non-volatile memory device. If the memory includes a fixed portion, the fixed portion can be implemented using a ROM, a PROM, an EPROM, and EEPROM, a CD-ROM and disk drive, a DVD-ROM and disk drive, a writable optical disk and disk drive, or any other known or later developed fixed or non-volatile memory device.

Figure 2:
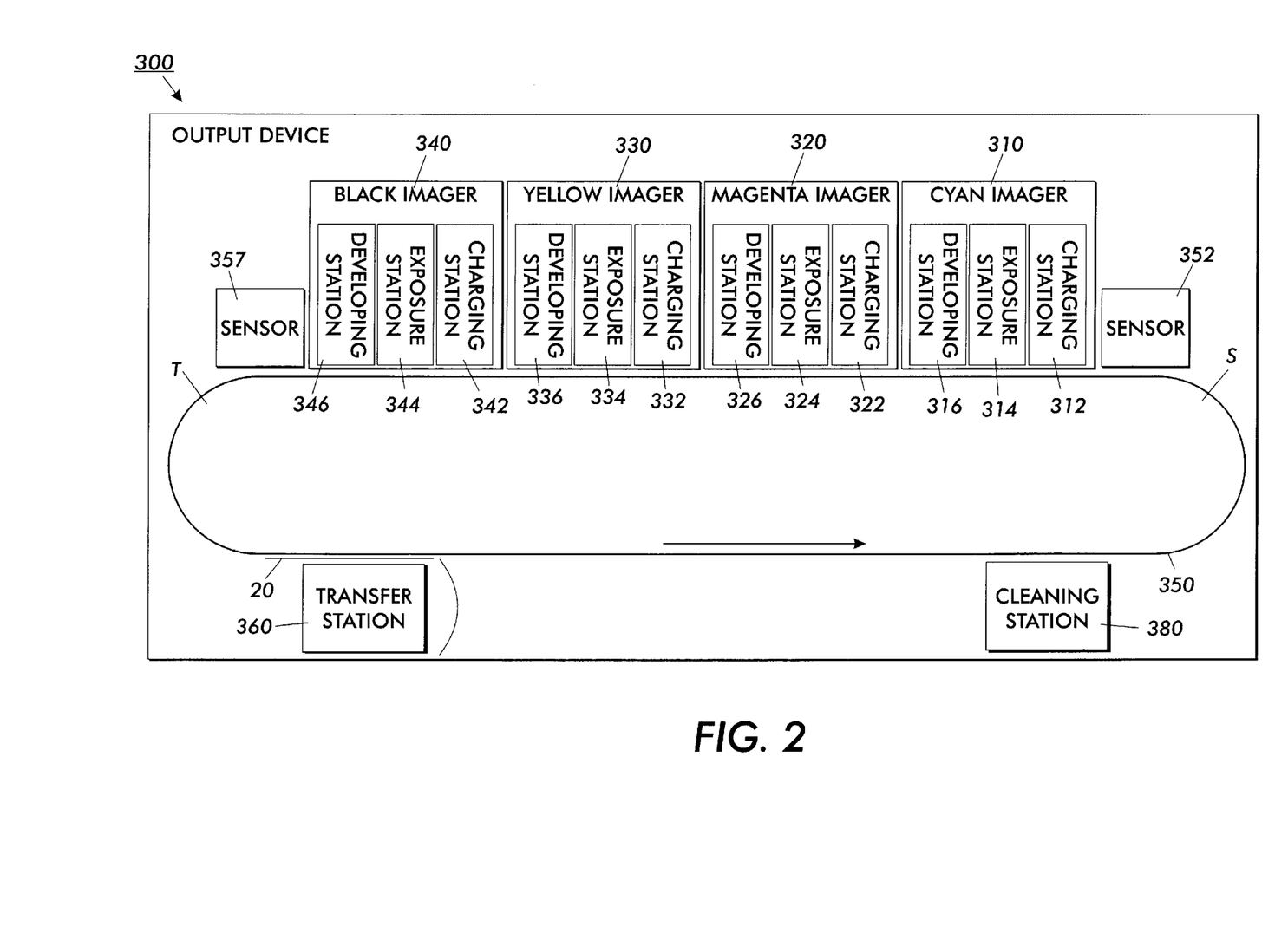
FIG. 2 shows one exemplary embodiment of an image forming device incorporating one exemplary embodiment of the image registration control systems and methods of this invention.

During a set-up procedure, the image registration control system 240 automatically calibrates one or more registration sensors 357, as shown in FIG. 2, to account for variations in machine conditions. During the print run, the image registration control system 240 adjusts the control information for the electronic data stored in the memory 230 for each different color subimage, or color separation image, of the electronic image data. The image registration control system 240 then outputs adjusted image control signals that control how the electronic image data is output to or by the image output terminal 300. The image registration control system 240 provides the image processing apparatus 200 with the capability to automatically calibrate the one or more registration sensors 357 and to monitor and adjust the image color registration using the one or more calibrated registration sensors 357 while making prints.

While FIG. 1 shows the image registration control system 240 and the image output terminal 300 as portions of an integrated system, the image registration control system 240 could be provided as a separate device from the image output terminal 300. That is, the image registration control system 240 may be a separate device attachable upstream of a stand-alone image output terminal 300.

For example, the image registration control system 240 and one or more of registration sensors 357, as shown in FIG. 2, may be implemented as devices which interface with both the image data source 100 and the hard image output terminal 300. For example, the image registration control system 240 may be incorporated into a network print server that forms a portion of the image data source 100 and that receives the sensor signals from the one or more registration sensors 357, and that controls the output of the image data to the image output terminal 300.

Furthermore, the image registration control system 240 may be implemented as software executing on the image processing apparatus 200 and/or the image data source 100. Other configurations of the elements shown in FIGS. 1 and 2 may be used without departing from the spirit and scope of this invention.

FIG. 2 shows one exemplary embodiment of the image output terminal 300 according to this invention. As shown in FIG. 2, the image output terminal 300 includes a plurality of color imagers 310–340, a photoreceptor belt 350, a transfer station 360, and a cleaning station 380. Each of the color imagers 310–340 are located along the length of the photoreceptor belt 350 between a steering end S of the belt 350 and a transfer end T of the belt 350. In particular, each of the color imagers 310–340 includes a charging station 312, 322, 332, and 342, respectively, an exposure station 314, 324, 334, and 344, respectively, and a developing station 316, 326, 336, and 346, respectively.

In the exemplary embodiment of the image output terminal shown in FIG. 2, each of the respective charging stations 312–342 of the imagers 310–340 charges the photoreceptor belt 350 in preparation for forming a latent electrostatic image. In each of the imagers 310–340, each of the respective exposure stations 314–344 exposes the charged photoreceptor belt 350 to form a latent image on the photoreceptor belt 350. Then, in each of the imagers 310–340, each of the respective developing stations 316–346 applies toner of a different color to develop the corresponding latent image formed on the photoreceptor belt 350 using the differently-colored toner.

It should be appreciated that each of the exposure stations 314–344 may be implemented using any known or later developed device for forming a latent image on the photoreceptor belt 350. For example, the exposure stations 314–344 could be a rotating polygon raster output scanner (ROS), a full width printbar containing light emitting diodes, laser diodes, organic light emitting diodes or the like.

During the print run, one or more registration sensors 357 determine the image registration offset in accordance with the position of the images on the photoreceptor belt 350. The image registration control system 240 then determines, based on the lateral belt position signals generated by one or more belt sensors (not shown) and the image position signals generated by the one or more registration sensors 357, the amounts of registration offset at the belt positions corresponding to the various positions where the exposure stations 314–344 are writing the latent images on the photoreceptor belt 350. The one or more image registration sensors 357 are described in U.S. patent application Ser. No. 09/306,418, incorporated herein by reference in its entirety.

Based on the registration offsets at the writing positions of each of the exposure stations 314–344 determined by the image registration control system 240 during the print run, the image control system 240 modifies the image control signals that control the output of the image data by at least three of the imagers 310–340, so that the latent images written by each of the exposure stations 314–344 will be substantially aligned. The positions of the various color separation images on the photoreceptor belt 350 can be adjusted in several dimensions to achieve appropriate alignment accuracy.

Registration offsets during the print run may include any or all of displacement components in either the process direction or the lateral direction transverse to the process direction, or magnification components in either the process direction or the transverse direction. That is, the controlled features for writing the image data on the photoreceptor belt 350 include, for example, the process margin, the image skew, the lateral margin, and the lateral magnification.

Different types of registration sensors 357, or different types of components within a single registration sensor 357, may cause incorrect readings when used to register the different color separation layers under a variety of machine conditions, such as variances in toner concentration, sensor susceptibility and/or toner contamination on the sensor. For example, an incorrect number of signals may be detected by the various registration sensors 357, or the various registration sensing components of a single registration sensor 357. This incorrect number of signals may cause the image control system 240 to incorrectly adjust the image and/or control data to account for the incorrectly-determined misregistration or offset. Accordingly, in the systems and methods according to this invention, the one or more registration sensors 357 are calibrated prior to the print run, such as during an initial set-up process or during a subsequent set-up process.

The one or more registration sensors 357 are calibrated during a sensor calibration process that occurs, for example, during a machine set up procedure, to account for false readings stemming from phenomenon such as variations in toner concentration, variations in sensor susceptibility or toner contamination on the sensor that occur due to variations in machine conditions. The image registration control system 240, during the sensor calibration process, determines the amount of voltage generated by each registration sensor 357 at the belt positions corresponding to various positions of various calibration marks. The image registration control system 240 then uses the determined results to determine the desired operating conditions to use with each of the one or more registration sensors 357, such as the drive currents to be applied to the one or more registration sensors 357.

Figure 3:
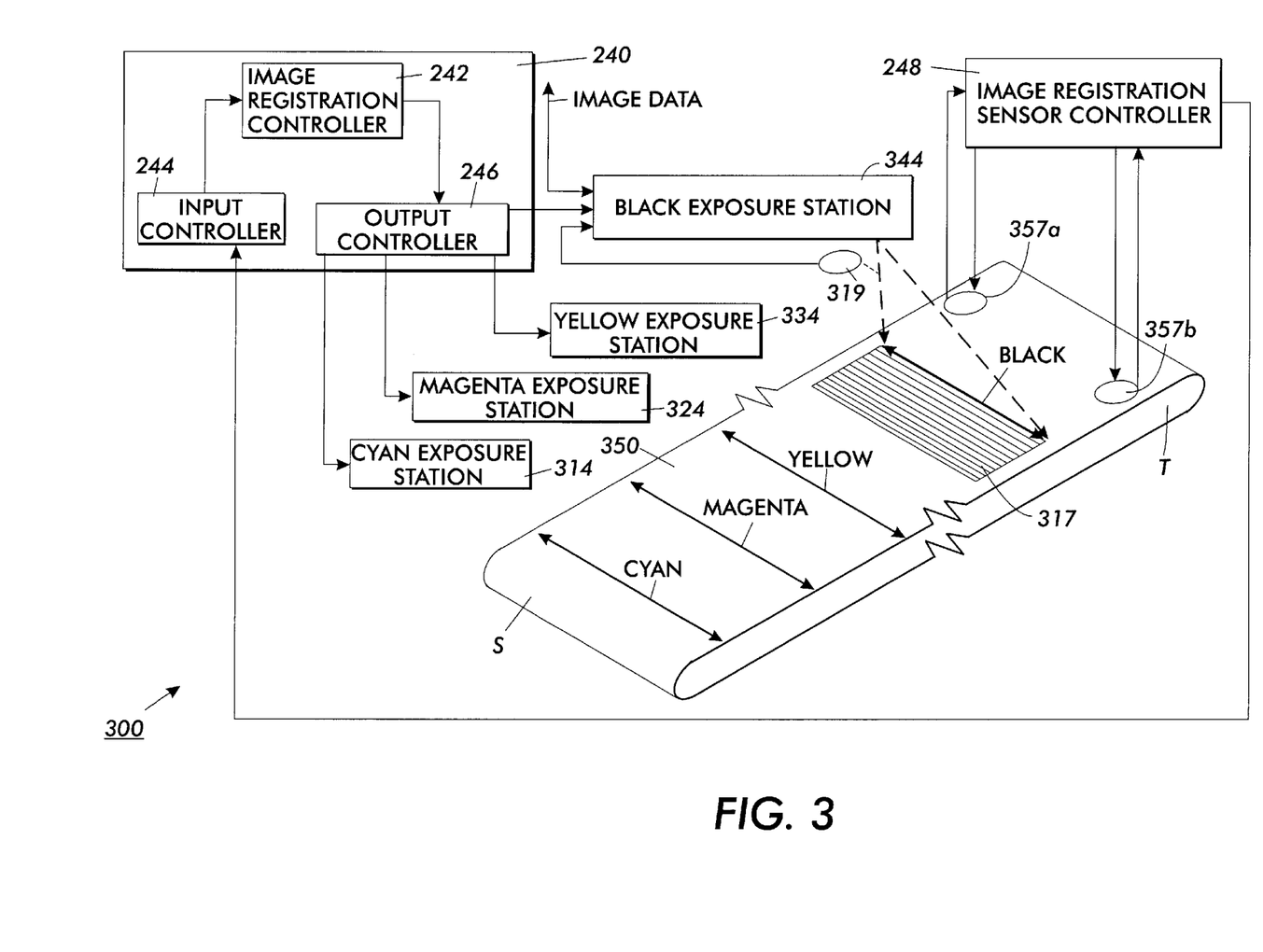
FIG. 3 shows in greater detail one exemplary embodiment of the photoreceptor belt shown in FIG. 2 and one exemplary embodiment of the image registration control system of FIG. 1 in accordance with this invention.

FIG. 3 shows in greater detail one exemplary embodiment of the image output terminal 300 shown in FIG. 2 and the image control system 240 shown in FIG. 1. As shown in FIG. 3, in this exemplary embodiment of the image output terminal 300, each of the imagers 310–340 are implemented using a raster output scanner to expose the photoreceptor belt 350. Each of the exposure stations 314–344 modulates one or more light beams based on the input image data. The at least one modulated light beam is then imaged onto a facet of a rotating polygon by a set of input optics. Each light beam is then reflected from the current facet of the rotating polygon so that each modulated light beam is imaged onto the photoreceptor belt 350 using a set of output optics (not shown). It should be appreciated that the image output terminal 300 can use any other known or later developed imager. Such imagers include, but are not limited to, LED bars or linear arrays of exposure devices.

As shown in FIG. 3, during the sensor calibration process, the image registration control system 240 will receive, from the image registration sensor controller 248, one or more determined differences between signals generated by each of the sensors 357 for each of the four colors and signals generated by each of the sensors 357 for the bare photoreceptor belt, to calibrate the one or more registration sensors 357 using the input determined differences. The image registration control system 240 is then initialized.

During the print run, the image registration control system 240, based on the current values for the various registration offsets of the photoreceptor belt 350, generates, for each imager 310–340, an imager-specific control signal that will be used by a corresponding exposure station 314–344. Using its imager-specific control signal, the corresponding exposure station 314–344 determines, in response to receiving the start-of-scan signal from a corresponding start-of-scan sensor 319, when to begin modulating light beam, or light beams, based on the image data for the current scanline.

That is, in one exemplary embodiment, based on the timing control signals from the image registration control system 240 and the feedback signals from the start-of-scan sensor 319, the exposure stations 314–344 begins modulating the light beams based on the image data for the current scanline at a point in time which eliminates the registration offsets. Each modulated light beam is then is imaged onto a facet of a rotating polygon (not shown) of the corresponding exposure station 314–344.

As shown in FIG. 3, the image registration control system 240 includes a image registration controller 242, an input controller 244, an output controller 246, and an image registration sensor controller 248. The input controller 244 receives the signals output from the image registration sensor controller 248. The image registration sensor controller 248 controls the output to the registration sensors 357 during the set-up procedure and the output controller 246 controls the output of the image data by the exposure stations 314–344 during the print run.

While FIG. 3 shows the image registration control system 240 provided as a separate device from the image registration sensor controller 248, it should be appreciated that the image registration control system 240 and the image registration sensor controller 248 could be portions of an integrated system.

At machine start-up and when recovering from unknown conditions, a control set-up procedure for the image control is performed. These are the only times the control set-up procedure must be performed. Of course, it should be appreciated that the control set-up procedure can be performed whenever desired by a user.

During the set-up procedure, the sensor calibration process can be performed. During the sensor calibration process, the image registration control system 240 will receive, from the image registration controller 248, one or more determined differences between signals generated by each of the sensors 357 for a particular color and signals generated by each the sensors 357 for the bare photoreceptor belt upon sensing one or more calibration marks on the photoreceptor belt 350. For example the one or more registration sensors 357 can be marks-on-belt sensors that sense one or more calibration marks developed on the photoreceptor belt 350, as discussed below. The one or more registration sensors 357 can include, for example, one or more in-board sensors 357a and one or more out-board sensors 357b. The output signals from the one or more registration sensors 357 can be input directly to the image registration sensor controller 248. The image registration sensor controller 248 determines at least one difference between the input values for a particular color calibration mark and the input values for the bare photoreceptor belt. The determined difference is input to the input controller 244 of the image registration control system 240. The image registration sensor controller 248 calibrates the one or more registration sensors 357 using the determined difference and the calibration result from the output controller 246 to control the registration sensor 357. The image registration control system 240 is then initialized.

Once it is initialized, the image registration control system 240 will monitor and control image registration by sensing image registration marks with the one or more calibrated registration sensors 357, and will output adjusted image control signals to the exposure stations 314–344 based on the sensor signals from the one or more calibrated registration sensors 357.

To directly measure the positions of the color separation images, at least two image registration marks are imaged onto the photoreceptor belt 350 for each of the colors. In particular, a first mark is laterally displaced from a second mark. The in-board sensor 357a detects at least the first mark while the out-board sensor 357b detects at least the second mark. Differences in the components between the one or more in-board sensors 357a and the one or more out-board sensors 357b in the process direction or the lateral direction, or magnification components in either or both of the process or lateral directions, indicate the registration offset in the image data for the process margin, the image skew, the lateral margin, and the lateral magnification, for example. One exemplary embodiment of the marks-on-belt sensors is described in U.S. Pat. No. 5,537,190 to Folkins et al., incorporated herein by reference in its entirety.

The one or more registration sensors 357 directly measure the image registration offsets of the controlled features for writing the image data on the photoreceptor belt 350. For example, the one or more registration sensors 357 measure the lateral registration directly by sensing the image registration marks.

During the print run, the results from sensing the image registration marks by the one or more registration sensors 357a and 357b are input to the image registration sensor controller 248. The image registration sensor controller 248 in turn inputs the sensed results to the input controller 244. The image registration controller 242 then modifies the image control signals to control, for example, the process margin, the image skew, the lateral margin, and the lateral image magnification, without going off-line, i.e., without stopping the printing process or skipping imaging panels.

Figure 4:
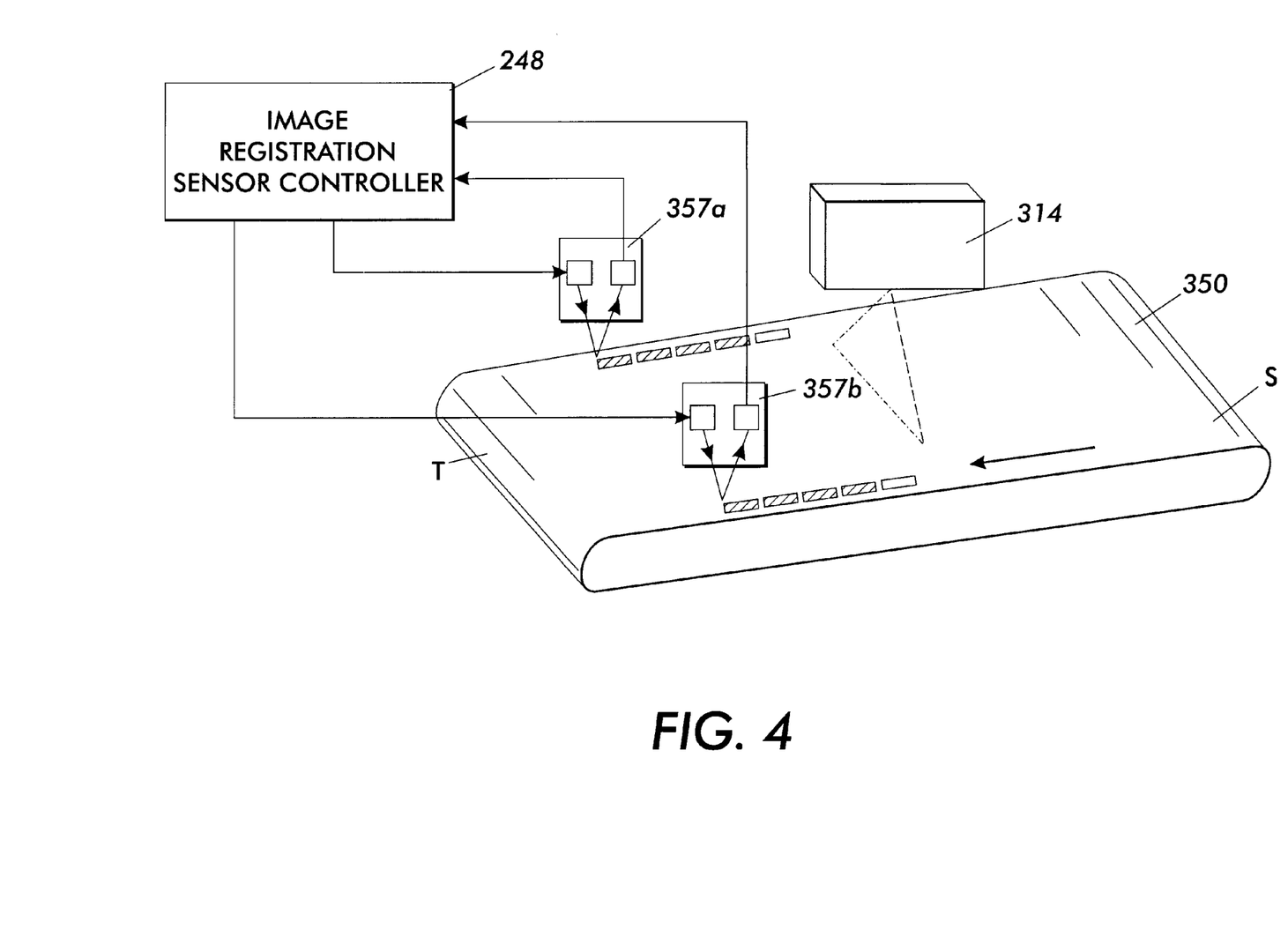
FIG. 4 shows in greater detail a first exemplary embodiment of the registration sensors shown in FIG. 3.

FIG. 4 shows one exemplary embodiment of the one or more registration sensors 357 and the sensed calibration marks used during the sensor calibration process. As shown in FIG. 4, the one or more registration sensors 357 are used during the sensor calibration process to collect data from the calibration marks on the photoreceptor belt 350. The image registration controller 242 processes this data into separate adjustments used to calibrate the registration sensors 357 for each color. The image registration controller 242 accomplishes this by obtaining determined measured value differences between marks for each of the four colors and marks for the bare photoreceptor belt from the image registration sensor controller 248.

In particular, the image registration sensor controller 248 obtains measured values for each color calibration mark and the bare photoreceptor operating under various conditions for the one or more registration sensors 357. The image registration sensor controller 248 then generates a data table by determining the measured differences between the various color calibration marks and the bare photoreceptor at each of the various operating conditions occurring when the one or more registration sensors 357 are used to sense the various color calibration marks. The generated data table indicates relationships between the sensor characteristics and the differences in feedback values. Thus, from the data table obtained by the image registration sensor controller 248, the image registration controller 242 determines the desired operating condition for operating the one or more registration sensors 357 during the print run.

As shown in FIG. 4, in one exemplary embodiment of the systems and methods of this invention, the one or more registration sensors 357a and 357b are driven using an initial amount of current as the initial condition. Each of the sensors 357a and 357b outputs voltages that are fed back to the image registration sensor controller 248. These sensed values are an indication of the illumination detected by sensors 357a and 357b. The image registration sensor controller 248 stores the sensed values from each sensor in a table for each of the separate color calibration marks, including but not limited to, cyan, magenta, yellow, and black marks, and the bare photoreceptor belt, at that amount of current.

As the amount of current used to drive the registration sensors 357a and 357b increases, the image registration sensor controller 248 continues to store in the table the sensed values for the current value of the drive current amount. The image registration sensor controller 248 then determines the voltage difference between each sensed value for each color and the sensed value for the bare photoreceptor belt. Using the determined voltage differences, the image registration controller 242 determines the operating condition with respect to the differential voltage set point. The differential voltage set point is determined as the point where a predetermined acceptable voltage difference between the least reflective non-black color and the bare photoreceptor belt is obtained. The image registration controller 242 then uses the differential voltage set point to determine the desired drive current for each sensor 357, or for each separate sensor component of the one or more sensors 357. The image registration sensor controller 248 uses the desired drive current to drive the one or more sensors, or sensor component 357, during the print run.

Figure 5:
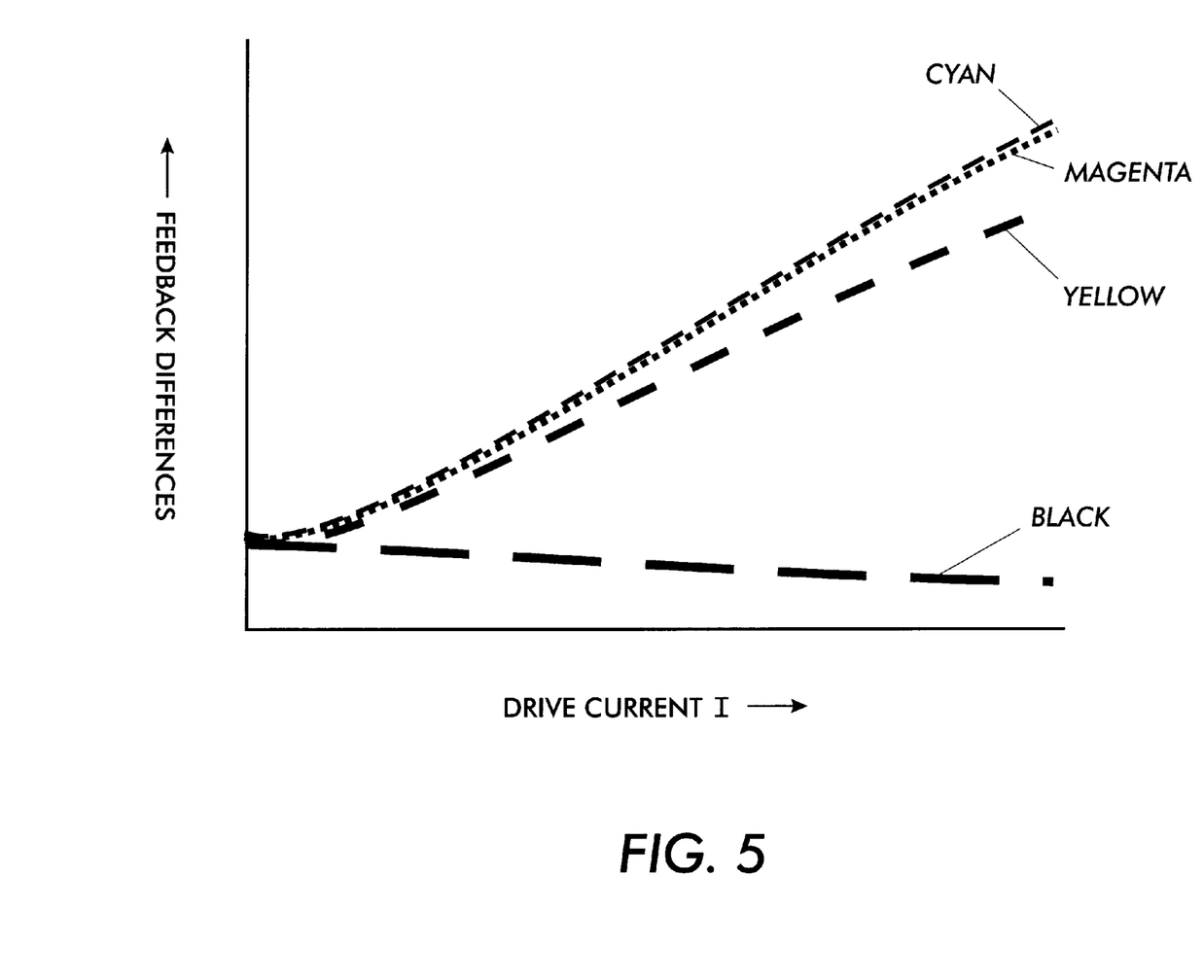
FIG. 5 is an exemplary graph of the results obtained by using the systems and methods according to this invention.

FIG. 5 is an exemplary graph showing the relationship between the drive current and the differences between the feedback values for the bare photoreceptor belt and the feedback values for the various color calibration marks of various above-described embodiments. As shown in FIG. 5, there is a generally linear relationship between the current amount and the differences in feedback values for each of the respective colors. As discussed above, the operating condition with respect to the differential voltage set point can be determined for the least reflective non-black color. That is, as shown in FIG. 5, the line for black, though is the least reflective, is not useful in determining the operating condition, since the slope is negligible. Thus, the operating condition is found using the least reflective non-black value. Using this generally linear relationship for the least reflective non-black color, while finding the operating condition as discussed above, a desired drive current for all colors is determined.

In particular, as shown by the generally linear relationship in FIG. 5, the feedback difference is the product of the slope and the current. The desired drive current is then determined as the ratio of the feedback difference set point to the slope. As discussed above, the feedback value set point includes the acceptable feedback difference between the calibration mark for the bare photoreceptor belt and the particular calibration mark for the respective colors. Once the desired drive current is found for each sensor 357, or for each separate component of the one or more sensors 357, the desired drive current is then used during the print run as the calibrated values.

It should be appreciated that any known or later developed mechanism, device or structure may be used to sense the difference in characteristics between calibration marks, including, but not limited to, sensors that sense the reflectance of the marks. Furthermore, it should be appreciated that, although the exemplary embodiments described above use the drive current as the varying condition in order to calibrate the registration sensors, any condition, or set of conditions, may be used to determine the relationship between the sensor characteristic and the sensed marks.

Figure 6:
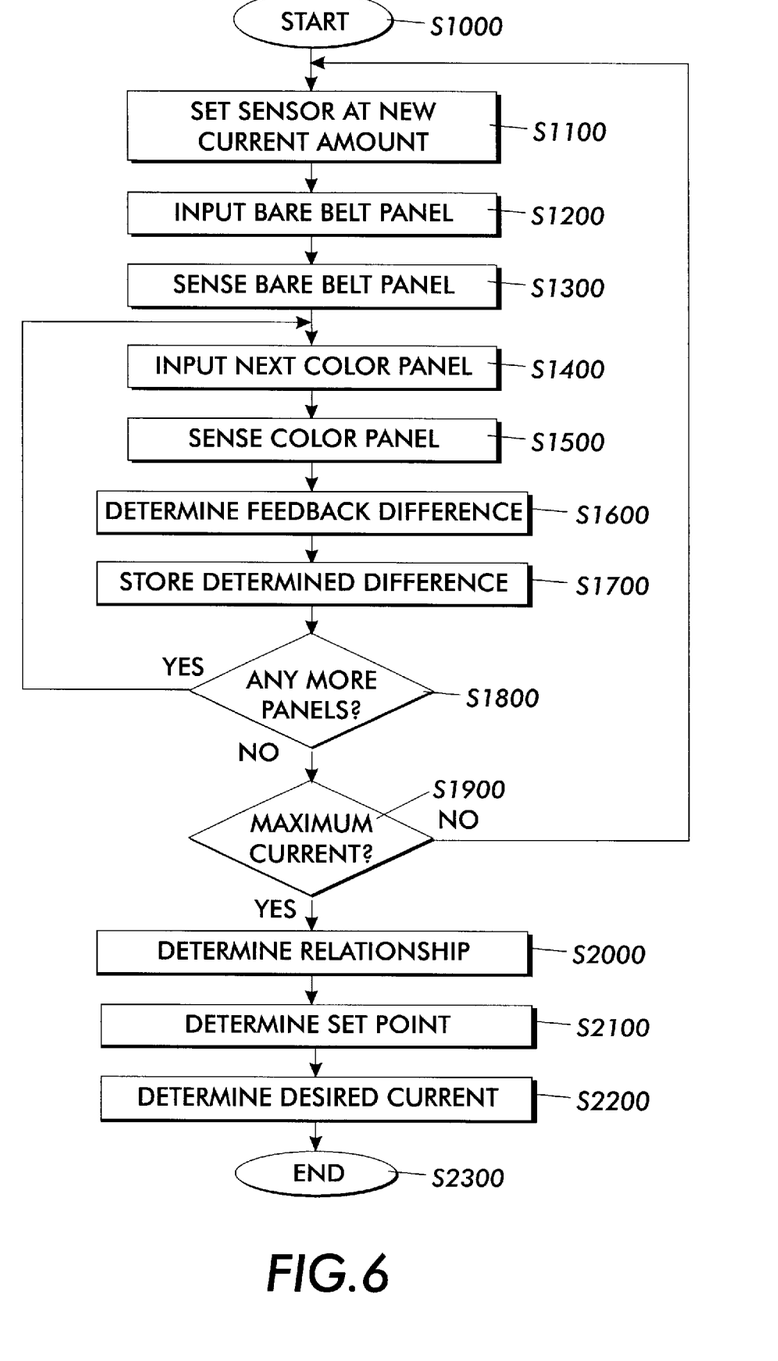
FIG. 6 is a flowchart outlining one exemplary embodiment of the calibration methods according to this invention.

FIG. 6 is a flowchart outlining one exemplary embodiment of the calibration methods of this invention for each color set-up mark. Starting in step S1000, control continues to step S1100, where the drive current for each of the one or more sensors or sensor components is incremented and the one or more sensors or sensor components are driven using that drive current. In FIG. 5, the current values input are arbitrarily chosen as 2 mA to 70 mA, in increments of 2 mA. However, it should be appreciated that this invention is not limited to this input amount, and that any values may be applied in any intervals.

Next, in step S1200, the bare photoreceptor belt panel is input. Then, in step S1300, the bare belt panel is detected. Control then continues to step S1400.

In step S1400, the next panel of the four color panels is input. These four panels include, for example, the four color panels imaged onto the photoreceptor for a four-color printer. Then, in step S1500, the current color panel is detected. Next, in step S1600, the difference for each sensor or sensor component between the sensed belt panel value and the sensed color panel value at that drive current is determined. In step S1700, the determined difference is stored in a table for each sensor or sensor component for that color at that drive current. Control then continues to step S1800.

In step S1800, a determination is made whether there are any more color panels to detect. If so, control returns to step S1400. Otherwise, data for all of the panels have been collected and control continues to step S1900.

In step S1900, a determination is made whether the drive current is equal to a predetermined maximum. If not, control returns to step S1100. Otherwise, once a determination is made that the predetermined maximum drive current has been used, control continues to step S2000. As shown in FIG. 5, the maximum drive current amount is predetermined to be 70 mA. However, it should be appreciated that any value may be chosen as the predetermined maximum that provides sufficient data for determining the relationship, discussed below, between the drive current and the stored determined differences.

In step S2000, for each different sensor or sensor component, the relationship between the stored determined differences and the input drive current values are determined using the stored determined difference values. As shown in FIG. 5, the determined relationship is the slope of the line for the particular color. However, it should be appreciated that any relationship may be applied that is sufficient for determining the desired drive current discussed below. Additionally, two or more relationships could be used.

Next, in step 2100, a common difference set point is determined as the acceptable sensed difference between the photoreceptor belt and the reflective colors for all sensors or sensor components. Then, in step S2200, for each different sensor or sensor component, the determined relationship and the determined set point are used to obtain the desired drive current for all of the sensors. The least reflective color not including black, which is shown as yellow in FIG. 5, is used to find the desired drive current to drive the sensors for all of the colors. Control then continues to step S2300, where the control routine ends.

Figure 7:
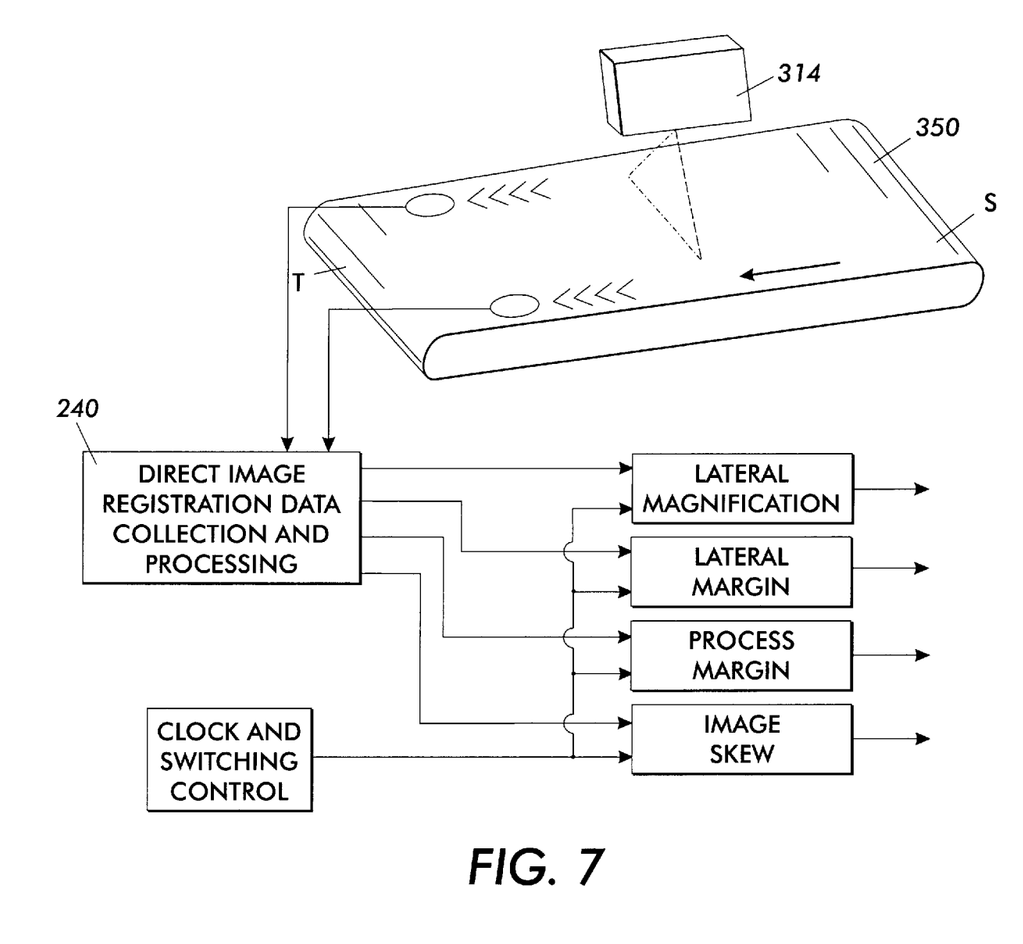
FIG. 7 shows in greater detail a second embodiment of the registration sensors shown in FIG. 3.

As shown in FIG. 7, the one or more registration sensors 357 are used during the print run to collect data from the image registration marks on the photoreceptor belt 350, where the marks are made in inter-document zones between the image color separation layers. This data is processed into separate adjustments used to control the registration. The registration error is measured directly using the one or more registration sensors 357. The image registration sensor controller 248 samples the edges of the photoreceptor belt 350 at a much higher rate and infers the registration error between reading the output signals of the sensors 357 by the motion of the photoreceptor belt 350.

To directly measure the positions of the color separation images, at least two marks are imaged onto the photoreceptor belt 350 for each of the color separation images, along with the color separation images. In particular, a first mark is laterally displaced from a second mark. The one or more in-board sensors 357a detect at least the first mark while the one or more out-board sensors 357b detect at least the second mark. Differences in the components between the in-board and the out-board sensors 357a and 357b in the process direction or the lateral direction, or magnification components in either or both of the process or lateral directions, indicate the registration offset in the image data for the process margin, the image skew, the lateral margin, and the lateral magnification, for example.

It should be appreciated that any known or later developed mechanism, device or structure may be used to sense the process margin, the image skew, the lateral margin, and the lateral magnification, for example.

During machine set-up, the image registration controller 242 also collects data on the nominal image source delay, the lateral margin, and the lateral magnification values of the photoreceptor belt 350 at the positions of the one or more in-board and out-board sensors 357a and 357b of the one or more registration sensors 357 for each color separation along the belt 350 relative to a reference separation. The reference color separation is typically the cyan color separation, but is not limited to the cyan color separation.

The image registration controller 242 reduces this data to average, or otherwise filtered, image registration adjustment values and stores the image registration adjustment values in a nominal image registration table. The nominal image registration table has one entry for each adjustment for the lateral margin, the image skew, the lateral magnification and the process margin. The image registration controller 242 then uses this nominal image registration table initially at time t=0 and then when determining the adjustments to the lateral margin, the image skew, the lateral magnification and the process margin values to be made during a print run.

The image registration controller 242 modifies the image control signals that control the output of the image data using, for example, the nominal image registration position table. The nominal image registration position table serves to link the machine set-up measurements for the process margin, the image skew, the lateral margin, and the lateral magnification, for example, and the image registration adjustment measurements. Measured process margin, image skew, lateral margin, and lateral magnification values are used to determine the changes necessary to adjust the image registration. The determined changes, or instantaneous updates, are added to the nominal values determined in the set-up process.

The changes that come from the output of the image registration controller 242 are changes with respect to the current images. This means that the adjustments are relative to the last updates made. The changes must be accumulated from update to update. The nominal image registration table and the sampled data are thus synchronized to the photoreceptor belt 350. Based on the resulting actual measurements for the image skew, the lateral margin, the lateral magnification and the process margin values, the image adjustments to be made at the positions of the imagers 310–340 are determined. The image registration controller 242 continues to determine the instantaneous registration offsets throughout the print run to keep the images registered in the presence of thermal and other disturbances. The nominal registration table is described in copending U.S. patent application Ser. No. 09/306,418, incorporated herein by reference in its entirety.

As shown in FIG. 1, the image processing apparatus 200 is preferably implemented on a programmed general purpose computer. However, the image processing apparatus 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, which is capable of implementing the finite state machine that is in turn capable of implementing the flowchart shown in FIG. 6, can be used to implement the image processing apparatus 200.

This invention has been described in connection with the preferred embodiments. However it should be understood that there is no intent to limit the invention to the embodiments described above. On the contrary, the intent to cover all alternatives, modification, and equivalents as may be included within the spirit and scope of the invention.

What is claimed is:

1. An image forming device, comprising:
   an image carrying device;
   at least one imager that images at least one set-up mark formed on the image carrying device;
   at least one sensor provided adjacent to the image carrying device that provides at least one feedback value for the set-up mark and at least one feedback value for the image carrying device outside the set-up mark;
   a difference circuit that determines at least one difference between the at least one feedback value for the set-up mark and the at least one feedback value for the image carrying device outside the set-up mark; and
   an operating condition circuit that determines a desired operating condition for operating the at least one sensor based on the at least one determined difference.

2. The image forming device of claim 1, wherein the operating condition circuit determines an operating condition based on the at least one determined difference.

3. The image forming device of claim 2, further comprising a condition varying circuit that varies the operating condition for operating the at least one sensor during a set-up procedure, wherein the difference circuit stores the determined difference for the at least one sensor at each operating condition.

4. The image forming device of claim 3, wherein the operating condition circuit determines at least one relationship between the determined differences and the varied operating condition.

5. The image forming device of claim 4, wherein the operating condition circuit uses the determined set point value and the at least one determined relationship to obtain the desired operating condition.

6. The image forming device of claim 4, wherein the determined differences varies linearly with respect to the varied operating condition.

7. The image forming device of claim 6, wherein the determined at least one relationship comprises a slope.

8. The image forming device of claim 1, wherein the operating condition is a drive current.

9. The image forming device of claim 1, further comprising a plurality of imagers that image at least one set-up mark for each of at least two colors formed on the image carrying device.

10. The image forming device of claim 9, wherein the operating condition circuit determines a set point value, and determines an operating condition based on the determined difference between the feedback value for each of the set-up mark and the feedback value for the image carrying device outside each set-up mark and the set point value.

11. The image forming device of claim 10, wherein the set point value is an acceptable difference between the feedback value for a least reflective color and the feedback value for the image carrying device outside the set-up mark.

12. A method for operating an image forming device having an image carrying device, the method comprising:
    imaging at least one set-up mark formed on the image carrying device;
    providing at least one feedback value for the set-up mark and at least one feedback value for the image carrying device outside the set-up mark;
    determining at least one difference between the at least one feedback value for the set-up mark and the at least one feedback value for the image carrying device outside the set-up mark; and
    determining an operating condition for operating the sensor based on the at least one determined difference.

13. The method of claim 12, further comprising determining an operating condition based on the at least one determined difference.

14. The method of claim 13, further comprising varying the operating condition for operating the at least one sensor during a set-up procedure, and storing the determined difference for the at least one sensor at each operating condition.

15. The method of claim 14, further comprising determining at least one relationship between the determined differences and the varied operating condition.

16. The method of claim 15, further comprising using the determined set point value and the at least one determined relationship to obtain the desired operating condition.

17. The method of claim 15, wherein the determined differences varies linearly with respect to the varied operating condition.

18. The method of claim 17, wherein the determined at least one relationship comprises a slope.

19. The method of claim 12, wherein the operating condition is a drive current.

20. The method of claim 12, further comprising imaging at least one set-up mark for each of at least two colors formed on the image carrying device.

21. The method of claim 20, further comprising determining a set point value, and determining an operating condition based on the determined difference between the feedback value for each of the set-up mark and the feedback value for the image carrying device outside each set-up mark and the set point value.

22. The method of claim 21, wherein the set point value is an acceptable difference between the feedback value for a least reflective color and the feedback value for the image carrying device outside the set-up mark.

* * * * *